United States Patent
Mladenovic et al.

(10) Patent No.: US 7,584,044 B2
(45) Date of Patent: Sep. 1, 2009

(54) CAMSHAFT PHASER POSITION CONTROL SYSTEM

(75) Inventors: Ljubisa M. Mladenovic, Ann Arbor, MI (US); Kenneth J. Cinpinski, Ray, MI (US)

(73) Assignee: GM Global Technology Operations, Inc.

( * ) Notice: Subject to any disclaimer, the term of this patent is extended or adjusted under 35 U.S.C. 154(b) by 39 days.

(21) Appl. No.: 12/026,241

(22) Filed: Feb. 5, 2008

(65) Prior Publication Data

US 2009/0198437 A1 Aug. 6, 2009

(51) Int. Cl.
F02D 13/02 (2006.01)
(52) U.S. Cl. .................................... 701/102; 123/90.17
(58) Field of Classification Search .................. 701/102, 701/101, 103, 115; 123/90.15, 90.17
See application file for complete search history.

(56) References Cited

U.S. PATENT DOCUMENTS

| 5,570,621 | A | 11/1996 | Kabasin |
| 5,690,071 | A * | 11/1997 | Jankovic ..................... 123/436 |
| 5,937,806 | A | 8/1999 | Lyko et al. |
| 6,382,155 | B2 | 5/2002 | Simpson |
| 6,640,834 | B1 | 11/2003 | Hamkins et al. |
| 6,840,202 | B2 | 1/2005 | Simpson |
| 6,842,691 | B2 | 1/2005 | Hagner et al. |
| 6,915,767 | B2 | 7/2005 | Pfeiffer et al. |
| 7,403,849 | B1 * | 7/2008 | Watanabe et al. ........... 701/102 |

FOREIGN PATENT DOCUMENTS

JP 2003-206711 A * 7/2003

* cited by examiner

*Primary Examiner*—Hieu T Vo
(74) *Attorney, Agent, or Firm*—Harness, Dickey & Pierce, P.L.C.

(57) ABSTRACT

A camshaft phasor control system for an engine includes a position control module. The position control module generates a position control signal based on a camshaft position command signal and a gain signal. A gain circuit generates the gain signal based on the position control signal and feeds the gain signal back to the position control module. The position control module positions a camshaft of the engine based on the gain signal.

20 Claims, 5 Drawing Sheets

US 7,584,044 B2

CAMSHAFT PHASER POSITION CONTROL SYSTEM

FIELD

The present invention relates to engine control and, more particularly, to camshaft position detection and control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A camshaft actuates valves of an internal combustion engine. In a dual overhead camshaft configuration, the engine includes an exhaust camshaft and an intake camshaft for each bank of cylinders. Rotation of the camshafts actuates intake and exhaust valves of the engine. Position and timing between a crankshaft and the camshafts are adjusted for proper synchronization of spark ignition and fuel injection, which improves engine efficiency in fuel consumption and pollutant exhaustion.

An engine control system may include one or more camshaft phasing devices (cam phasors). A cam phasor may be used to create a continuously variable rotational offset between the exhaust camshaft and the intake camshaft and/or the crankshaft, which alters opening and closing time between intake and exhaust valves. Typically, cam phasors receive position information from a camshaft position sensor. The camshaft position sensor sends a signal to a control module. The control module develops an offset signal with respect to a commanded position signal, to control the cam phasors.

A cam phasor based control system typically includes a hydraulic actuator and control valve. The control valve is used to adjust passage of hydraulic fluid to the hydraulic actuator based on a position command signal and a current camshaft position signal. Viscosity and pressure of the hydraulic fluid can vary, which affects dynamic control performance. Cam phasor based control systems tend to be sensitive to variations in engine oil temperature, age and pressure, as well as noise due to position sensor variations. The control systems also tend to have varying response times. This can negatively affect engine performance.

SUMMARY

A camshaft phasor control system for an engine is provided that includes a position control module. The position control module generates a position control signal based on a camshaft position signal and a gain signal. A gain calculation circuit generates the gain signal based on the position control signal and feeds the gain signal back to the position control module. The position control module positions a camshaft of the engine based on the gain signal.

In another feature, a method of operating a camshaft phasor control system for an engine is provided that includes generation of a position control signal. The position control signal is generated based on a camshaft position error signal and a gain signal. The gain signal is generated based on feedback of the position control signal. A camshaft of the engine is positioned based on the gain signal.

In still another feature, a control system for an engine that includes a camshaft is provided. A camshaft sensor generates a camshaft signal that is indicative of position of the camshaft. A main control module generates a camshaft position command signal. A position control module generates a position control signal based on the camshaft signal, the camshaft position command signal and a gain signal. A gain calculation circuit receives the position control signal and generates the gain signal based on the position control signal. The position control module generates the position control signal to position the camshaft based on the gain signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
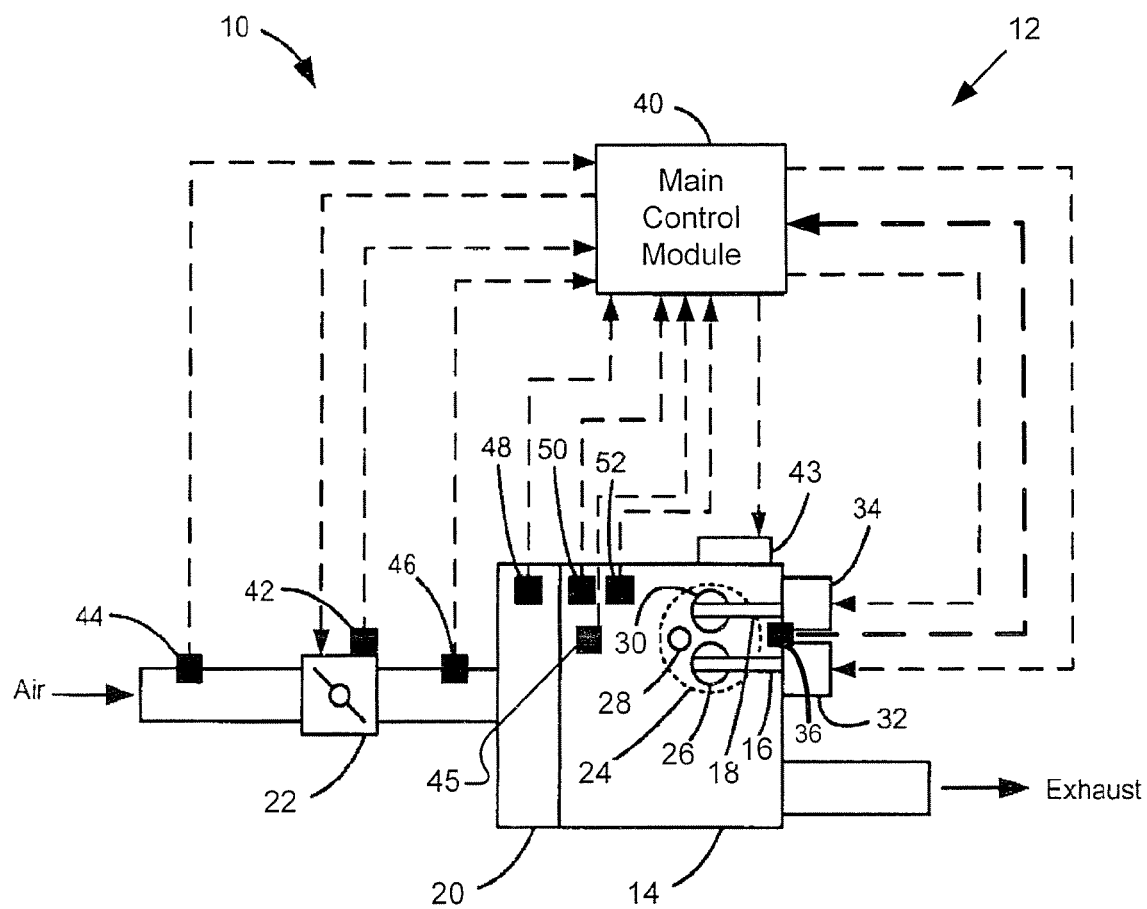
FIG. 1 is a functional block diagram of an engine control system that incorporates a camshaft phasor control system in accordance with an embodiment of the present disclosure.

The following description is merely exemplary in nature and is not intended to limit the present disclosure, application, or uses. As used herein, the term module refers to an application specific integrated circuit (ASIC), an electronic circuit, a processor (shared, dedicated, or group) and memory that execute one or more software or firmware programs, a combinational logic circuit, or any other suitable components that provide the described functionality. For purposes of clarity, the same reference numbers will be used in the drawings to identify similar elements.

Referring now to FIG. 1, a functional block diagram of an engine control system 10 that incorporates a camshaft phasor control system 12 is shown. An engine control system 10 includes an engine 14 that has one or more camshafts 16, 18. Position of the camshafts 16, 18 is controlled via the camshaft phasor control system 12. The camshaft phasor control system 12 is tuned based on known camshaft phasor control circuit characteristics and closed loop system performance, which maybe obtained from engine performance improvement information.

The camshaft phasor system characteristics may include gain, time constants, delay times, and other camshaft phasor characteristics. The engine performance improvement information may refer to camshaft and crankshaft position information, spark ignition, fuel injection, air flow, and other engine performance parameters. The camshaft phasor control system 12 has scheduled gains for control of one or more camshaft phasors to provide closed loop phase and gain margins that satisfy a given robustness criteria.

The control systems are easily and quickly tuned due to prior knowledge of the camshaft phasor system characteristics and closed loop performance. The tuning can be performed without the use of trial and error selection.

In use, the engine control system 10 allows air to be drawn into an intake manifold 20 through a throttle 22. The throttle 22 regulates mass air flow into the intake manifold 20. Air within the intake manifold 20 is distributed into cylinders 24. Although a single cylinder 24 is illustrated, it is appreciated that the camshaft phasor control system 12 may be implemented in engines having any number of cylinders.

An intake valve 26 selectively opens and closes to enable the air/fuel mixture to enter the cylinder 24. The intake valve position is regulated by an intake camshaft 16. A piston compresses the air/fuel mixture within the cylinder 24. A spark plug 28 initiates combustion of the air/fuel mixture, driving the piston in the cylinder 24. The piston drives a crankshaft to produce drive torque. Combustion exhaust within the cylinder 24 is forced out an exhaust port when an exhaust valve 30 is in an open position. The exhaust valve position is regulated by an exhaust camshaft 30. The exhaust is treated in an exhaust system and is released to the atmosphere. Although single intake and exhaust valves 26, 30 are illustrated, it is appreciated that the engine 14 can include multiple intake and exhaust valves 26, 30 per cylinder 24.

The engine system 10 further includes an intake camshaft phasor 32 and an exhaust camshaft phasor 34 that respectively regulate the rotational timing and/or lift of the intake and exhaust camshafts 16, 18. More specifically, the timing of the intake and exhaust camshafts 16, 18 can be retarded or advanced with respect to each other or with respect to a location of the piston within the cylinder 24 or crankshaft position. The intake and exhaust camshaft phasors 32, 34 regulate the intake and exhaust camshafts 16, 18 based on signal output from one or more camshaft position sensors 36. The camshaft position sensor 36 may be in the form of a camshaft phasor position sensor and measure position of an actuator. The camshaft position sensor 36 can include, but is not limited to, a variable reluctance or Hall Effect sensor. The camshaft position sensor 36 transmits output signals that indicate rotational position of the intake or exhaust camshafts 16, 18. The transmission may occur when the camshaft position sensor 36 senses the passage of a spaced position marker (e.g. tooth, tab, and/or slot) on a disc or target wheel coupled to the intake or exhaust camshafts 16, 18.

Figure 2:
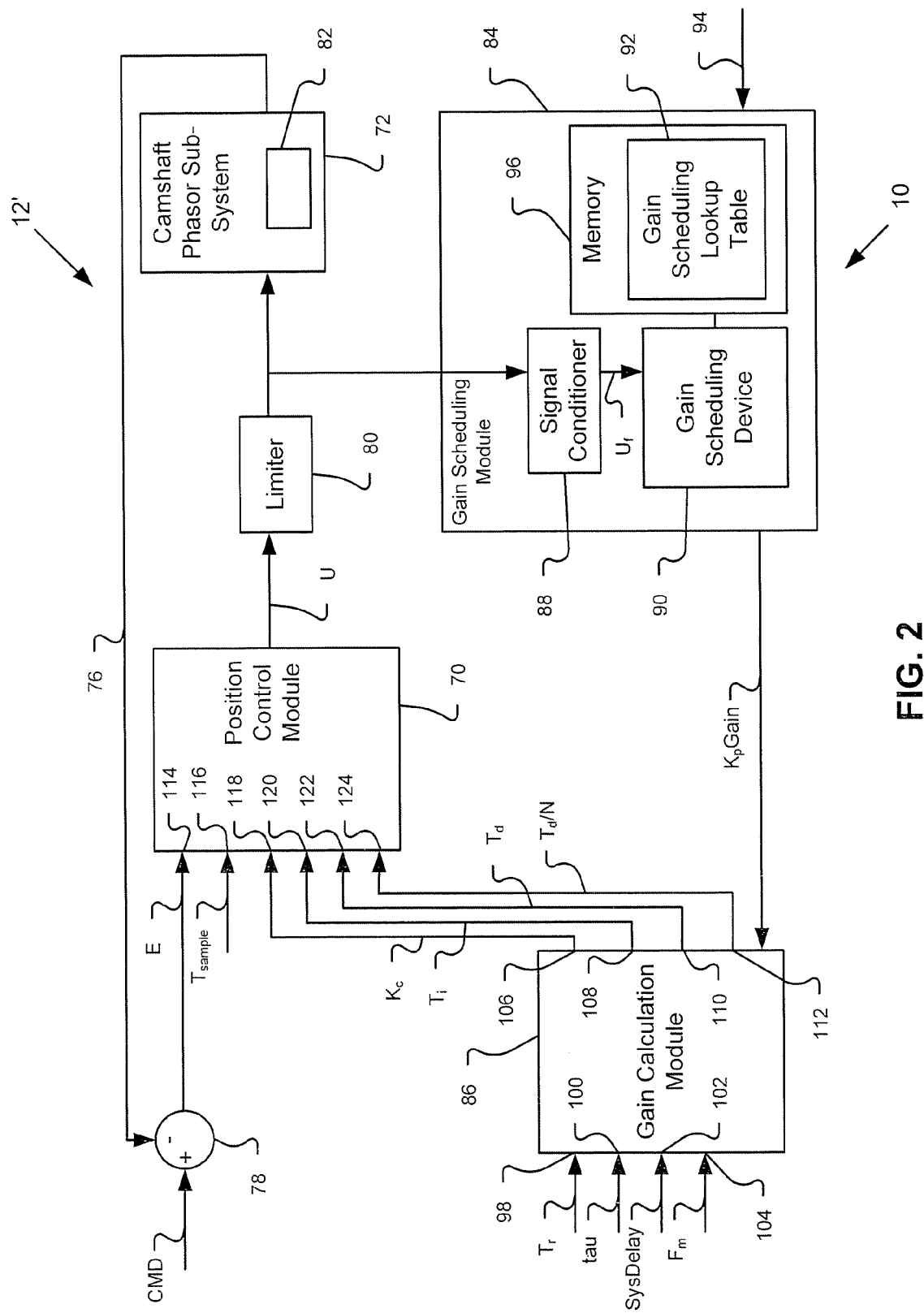
FIG. 2 is a functional block diagram of a camshaft phasor control system in accordance with an embodiment of the present disclosure.

A main control module 40 operates the engine based on the camshaft phasor control system 12. The main control module 40 may include a position control module, a gain scheduling module, and a gain calculation module, which are best seen in FIG. 2. The main control module 40 generates control signals to regulate engine components in response to engine operating conditions. The main control module 40 generates a throttle control signal based on a position of an accelerator pedal and a throttle position signal generated by a throttle position sensor (TPS) 42. A throttle actuator adjusts the throttle position based on the throttle control signal. The throttle actuator may include a motor or a stepper motor, which provides limited and/or coarse control of the throttle position.

The main control module 40 also regulates a fuel injection system 43 and the camshaft phasors 32, 34. The main control module 40 determines the positioning and timing (e.g. phase) between the intake or exhaust camshafts (intake or exhaust valves) 16, 18 and the crankshaft based on the output of the camshaft position sensor 36 and other sensors. For example, the positioning and timing may be conditioned based on a temperature signal from a hydraulic temperature sensor 45. The temperature sensor 45 may provide temperature of oil within the engine 14 and/or in a camshaft phasor control circuit, such as that shown in FIG. 2.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 20 and generates a MAP signal. An engine coolant temperature sensor 50 is responsive to a coolant temperature and generates an engine temperature signal. An engine speed sensor 52 is responsive to a rotational speed of the engine 14 and generates an engine speed signal. Each of the signals generated by the sensors is received by the main control module 40.

Referring now also to FIG. 2, a functional block diagram of a camshaft phasor control system 12' is shown. The camshaft phasor control system 12' may be used as part of or in replacement of the camshaft phasor control system 12. The camshaft phasor control system 12' provides control and is mathematically described as first order with integration effect and has nonlinear drifting gain. The gain may be influenced by oil temperature, oil viscosity, oil pressure, and aeration, as well as actuator valve electrical characteristics. Because of input nonlinearity, the camshaft phasor control system 12' has scheduled gains that are derived to provide closed loop phase and gain margins that satisfy a robustness criteria.

The camshaft phasor control system 12' includes a position control module 70, a camshaft phasor actuation sub-system 72, and a gain calculation module 74. The camshaft phasor control system 12' receives an error signal E based on a camshaft position command signal CMD and a camshaft position measurement signal 76, as well as multiple input signals from the gain module 74. The position command signal CMD may be generated by the main control module 40 and based on various engine parameters, such as engine speed, load or intake pressure, phasing between a camshaft and a crankshaft, and other engine parameters. The camshaft signal 76 may be generated by the camshaft sensor 36. The position command signal CMD and the camshaft signal 76 are summed via a summer 78 to generate the error signal E.

The position control module 70 generates a position control signal U that is representative of a pulse width modulated (PWM) signal, which is provided to the actuation sub-system 72 for camshaft position control. The position control signal U drives a hydraulic valve actuator and is converted into a PWM signal by the actuation sub-system 72.

The position control module 70 may be a proportional integral derivative (PID) control module. In one embodiment, the position control module 70 is in a series form, which is sometimes referred to as an interacting form, as opposed to being in a parallel form. The series form may include proportional derivative (PD) and proportional integral (PI) control modules that are coupled in series. The series form may, as another example, include proportional, integral, and derivative portions being in series. The position control module may be in a parallel form.

A limiter 80 may be coupled between the position control module 70 and the actuation sub-system 72. The limiter 80 limits and/or clips input to the actuation sub-system 72 between a minimum value and a maximum value.

Figure 3:
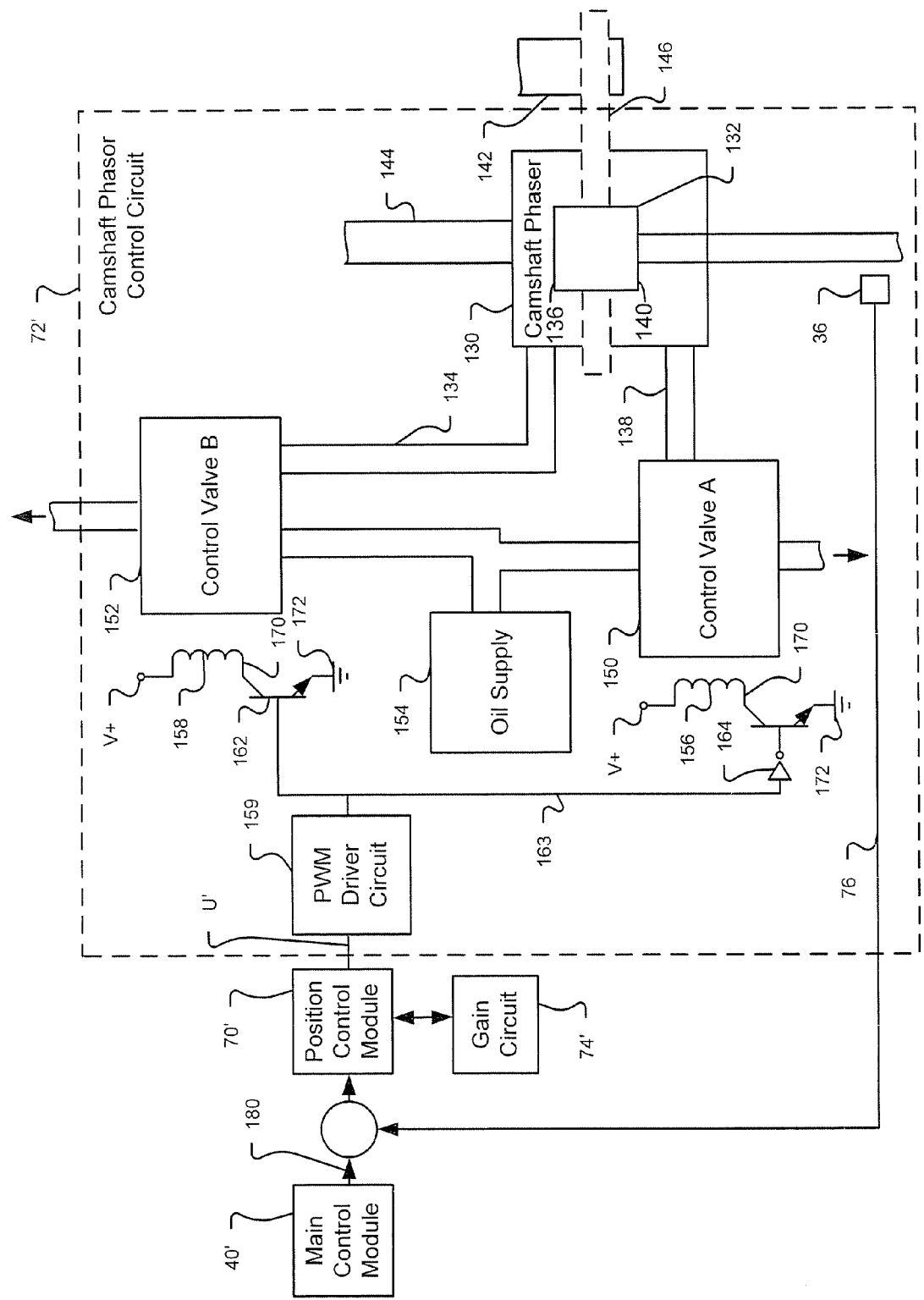
FIG. 3 is a functional block diagram illustrating an exemplary camshaft phasor actuation system in accordance with an embodiment of the present disclosure.

The actuation sub-system 72 may be referred to as a plant and may have an associated delay. The actuation sub-system 72 may include an electrohydraulic module 82, as shown, one or more control valves, an oil supply, and other electrical and hydraulic circuit components, some examples of which are shown in FIG. 3. The electrohydraulic module 82 may convert the position control signal U into the PWM signal for operation of one or more actuators or phasors. The actuation sub-system 72 may include the camshaft position sensor 36 and feedback the camshaft signal 76 to the summer 78.

The gain calculation circuit 74 includes a gain scheduling module 84 and a gain calculation module 86. The gain scheduling module 84 includes a signal conditioner 88, a gain scheduling device 90, and a gain scheduling table 92. The signal conditioner 88 may include and/or perform as a filter, such as a low pass filter for removal of noise. The gain scheduling device 90 looks up a process gain values to generate a process gain signal $K_p$Gain based on the position control signal $U_f$ and a temperature input signal 94. The process gain values may be looked up in the gain scheduling lookup table 92. The temperature input signal 94 may be generated by the temperature sensor 45.

The gain scheduling lookup table 92 correlates position control data and temperature data with process gain data. The gain scheduling lookup table 92 may be stored in a memory 96 and be accessible by the gain scheduling device 90. An example of a gain scheduling surface plot is provided in FIG. 4. Note that axis labeled PWM of the gain scheduling surface plot represents position control signal data, such as that generated by the position control module 70, and may not be actual pulse width modulated data, as that generated by the electrohydraulic module 82.

The gain calculation module 86 generates a proportional gain signal Kc based on the process gain signal $K_p$Gain. The gain calculation module 86 includes multiple inputs and outputs. The gain calculation module inputs include a system raise time input 98, a system time constant input 100, a system delay input 102, a phase margin input 104, and a process gain input 106, which respectively receive a system raise time signal $T_r$, a system time constant signal tau, a system delay signal SysDelay, a phase margin signal $F_m$, and a process gain signal $K_p$Gain. The system raise time signal $T_r$ and the phase margin signal $F_m$ characterize closed loop performance of the position control module. The system raise time signal $T_r$ refers to the rate at which the control system responds and may be, for example, in the form of timing between approximately 10% and 90% of the step input. The phase margin signal $F_m$ is based on a closed loop control system and is indicative of robustness of the position control module. The system time constant signal tau and the system delay time signal SysDelay characterize the camshaft actuation system and through gain calculation influence controller performance.

Based on the stated inputs, the gain calculation module 86 generates the proportional gain signal Kc, an integration time signal $T_i$, a derivative time signal $T_d$, and a filtered derivative signal $$\frac{Td}{N},$$

which are provided respectively to a proportional gain output 106, an integration time output 108, a derivative time output 110, and a filtered derivative output 112.

The position control module 70 includes multiple position control module inputs, which include an error input 114, a time sample input 116, a proportional gain input 118, an integration time input 120, a derivative time input 122 and a filtered derivative input 124. The error input 114 receives an error signal E from the summer 78. The time sample input 116 receives a time sample signal $T_{sample}$. The time sample signal $T_{sample}$ may be a predetermined and/or set parameter and used to set a sample rate of the position control module 70. The time sample signal $T_{sample}$, as an example, may be set to approximately 12.5 ms. The proportional gain input 118, the integration time input 120, the derivative time input 122 and the filtered derivative input 124 are coupled to and receive a proportional gain signal Kc, an integration time signal $T_i$, a derivative time signal $T_d$ and a filtered derivative time signal $$\frac{Td}{N},$$

respectively from the proportional gain output 106, the integration time output 108, the derivative time output 110, and the filtered derivative output 112.

Referring to FIG. 3, a functional block diagram illustrating an exemplary camshaft phasor actuation sub-system 72' is shown. The actuation sub-system 72' controls position of a phasor (hydraulic actuator) 130, which may include a piston 132, to provide for linear positioning thereof along a range of motion. The piston 132 may move bi-directionally. The piston 132 may move in a first direction when hydraulic fluid pressure from passage 134 is applied to a first side 136 of the piston 132. The piston 132 may move in a reverse direction of motion when fluid pressure from second passage 138 is applied to a second side 140 of the piston 132. The piston 132 moves, as influenced by hydraulic pressure applied thereto, along a sleeve attached to the phasor 130. The phasor 132 varies angular relationship between an engine crankshaft 142 and camshaft 144. For example, the piston 12 may be attached, via a paired block configuration or a helical spline configuration, to a toothed wheel. A chain 146 may be disposed on the toothed wheel and linked to the crankshaft 142. The phasor 130 is mechanically linked to the camshaft 144.

A control valve A 150 and a control valve B 152 are positioned to admit a varying quantity of hydraulic fluid through respective first and second passages 134, 138. The relative pressure applied to the sides determines the steady state position of the piston 132. Precise piston positioning along a continuum of positions within the sleeve of phasor 130 is provided through precise control of the relative position of control valves 150 and 152. The control valves 150, 152 receive hydraulic fluid, such as conventional engine oil, from an oil supply system 154. The oil supply system 154 may include an oil pump, which draws hydraulic fluid from a reservoir and passes the fluid to an inlet side of each of the control valves 150, 152 at a regulated pressure. The control valves 150, 152 may be three-way valves that have linear and magnetic field-driven solenoids.

The control valves 150, 152 are positioned based on current provided to coils 156, 158 of solenoids. In a rest position, the control valves 150, 152 are positioned to vent out fluid away from the piston 132, such that position of the piston 132 is not influenced by fluid pressure. As the control valves 150, 152 are actuated away from their rest positions, a portion of the vented fluid is directed to the corresponding sides and displacement of the piston 132.

PWM control is provided by current control of the coils 156, 158 via a PWM driver circuit 159. The PWM driver circuit converts the position control signal U into a PWM signal 163. The coils 156, 158 are activated via transistors 160, 162. The PWM signal 163 is passed to the first transistor 160 in uninverted form, and is passed in inverted form, via an inverter 164, to the second transistor 162. The PWM signal 163 may be a variable duty cycle signal and be similar to a limited and converted version of the position control signal U. The PWM signal 163 is applied to the bases of the transistors 160, 162. The inverting of the PWM signal 163 via inverter 164 provides activation of one transistor and deactivation of the transistor.

The transistors 160, 162 are connected between a low side 170 of the respective coils 156, 158 and a ground reference 172. A high side 174 of the coils 156, 158 is electrically connected to a supply voltage V+. The control valves 150, 152 are held, for a given duty cycle, in a fixed position corresponding to the average current in the coils 156, 158.

The position of the piston 132 is detected by the camshaft position sensor 36, and may be positioned in proximity to piston 132 to sense piston displacement. The camshaft position signal 76 is feedback to a main control module 40'. The main control module 40', through execution of periodic control operations, may generate camshaft position command signals 180 to determine hydraulic lag in the actuation subsystem 72'. The PWM signals are summed with the camshaft position signal 76 and provided to a position control module 70'. The position control module 70' is coupled to a gain circuit 74' and to a PWM driver circuit 163. The PWM driver circuit 163 generates the PWM signal 163 based on a position control signal U'.

The position control module 70' adjusts the position control signal U' in a controlled manner to overcome hydraulic lag, to provide a responsive position control of the piston 132 without oscillation, overshoot, and/or response delay. The position control signal U' and the camshaft position command signals 180 may be generated, for example as a predetermined function incorporating engine parameters, such as engine speed, load, and intake pressure. The PWM signal 163 is generated with an appropriate phasing between the camshaft and crankshaft. As an example, a comparison between an amount of change in the PWM signals and resulting change in the camshaft position signal 76 over a predetermined transient response period of time may be used to generate a transient response transfer function. As another example, the rate of reduction in the position error signal may indicate system responsiveness.

Figure 5:
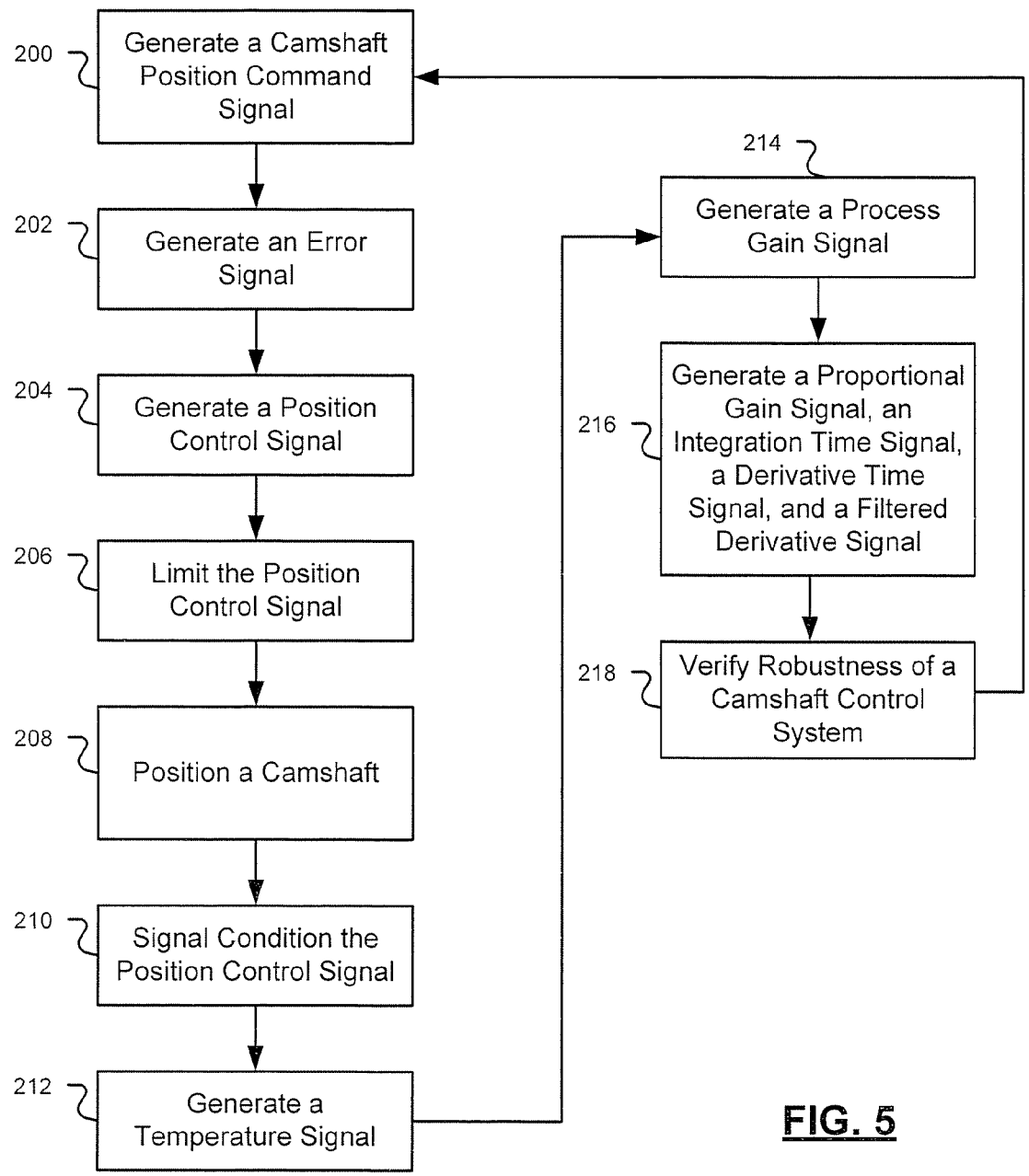
FIG. 5 is a flow diagram illustrating a method of operating a camshaft phasor control system in accordance with an embodiment of the present disclosure.

Referring to FIG. 5, a flow diagram illustrating a method of operating a camshaft phasor control system is shown. Although the following steps are primarily described with respect to the embodiments of FIGS. 1 and 2, they may be easily modified to apply to other embodiments of the present invention. Also, the below steps are described with respect to a single camshaft and control thereof, the steps may be applied to any number of camshafts.

In step 200, a main control module, such as the main control module 40, generates a camshaft position command (reference) signal to position a camshaft of an engine. An example of a camshaft position command signal is camshaft position command signal CMD.

In step 202, an error signal, such as the error signal E, is generated via a summer based on a camshaft position signal and a proportional (first) gain signal. Example camshaft position signal 76 and proportional gain signal Kc are shown in FIG. 2.

In step 204, a position control module, such as the position control module 70, generates a position control signal. The position control signal is generated based on the error signal, a time sample signal, the proportional gain signal, an integration time signal, a derivative time signal, and a filtered derivative signal. Examples of the stated signals are shown in FIG. 2.

In step 206, the position control signal is limited via a limiter, such as the limiter 80. In step 208, the camshaft is positioned based on the power control signal. The limited position control signal is converted to a PWM signal and used to position a phasor, such as the phasor 130. For example, the camshaft phasor circuit may position a phasor based on the received PWM limited signal.

In step 210, the position control signal is signal conditioned. The position control signal is provided to a gain calculation circuit, such as the gain calculation circuit 74, in a feedback arrangement. After reception by the gain calculation circuit, the position control signal is signal conditioned and/or filtered. In step 212, a temperature signal may be generated by, for example, the temperature sensor 45. The temperature signal may be an oil or hydraulic fluid temperature signal.

Figure 4:
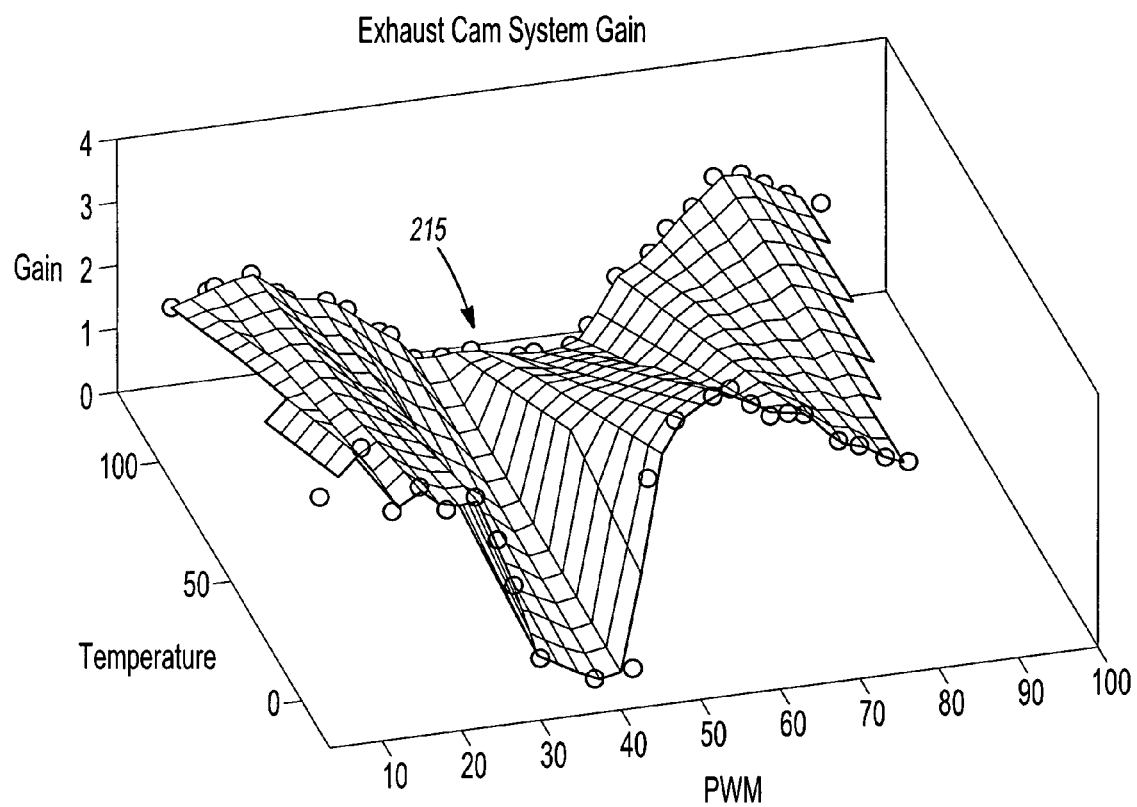
FIG. 4 is a an exhaust camshaft system gain surface diagram illustrating process gain of a camshaft phasor control system in accordance with an embodiment of the present disclosure.

In step 214, a process gain signal is generated based on the filtered position control signal and the temperature signal. The process gain signal may be generated via use of a lookup table, such as the gain scheduling lookup table 92, an example representation of which is provided in FIG. 4. The surface plot of FIG. 4 is of filtered position control signal data, temperature data and output process gain data. The process gain data may be predetermined and/or adjusted during vehicle operation. The process gain data may be determined based on various known engine performance parameters, known control system characteristics, and engine system device and fluid characteristics, many of which are stated above.

Referring to FIG. 2, the camshaft control system 12' has a quick and reliable response times, regardless of the magnitude of the camshaft position command signal CMD. Since a phasor is nonlinear, when in an equilibrium state, the gain associated therewith tends to remain constant. The camshaft control system 12' accounts for this situation and adjusts and increases the gain of the control module to a large value when the gain of the system or that received by the phasor is small. Conversely, when the gain of the actuation sub-system 72 is large then the gain of the position control module 70 is reduced to a small value. For example, in view of FIG. 4, when the process gain signal is low, the proportional gain signal may be increased. Arrow 215 designates a low gain area for the process gain signal $K_p$Gain.

Referring again to FIG. 5, in step 216, the proportional gain signal Kc, the integration time signal Ti, the derivative time signal Td, and the filtered derivative signal $$\frac{Td}{N}$$

are generated by a gain calculation module. The stated signals are generated based on the process gain signal and multiple input constants, such as a system raise time, a system time constant, a system delay time, and a phase margin, as shown in FIG. 2. The input constants may be set during a tuning process. The tuning process is based on known characteristics of a camshaft phasor sub-system 72 and engine performance information. In one example embodiment, the system raise time is set to approximately 0.3s, the system time constant is set to approximately 0.07s, the system delay time is set at two (2) samples or 25 ms, and the phase margin is set at approximately 60°. The stated values may vary per application.

The embodiments disclosed herein provide camshaft phasor control systems that have low sensitivity to actuation sub-system 72 parameter changes due to variation in a hydraulic actuation system caused by pressure and temperature. The setting of the phase margin, as described above, provides the low sensitivity.

The gain calculation module calculates the proportional gain signal for system robustness. For example, when a phasor changes due to ageing, such as when delay of the phasor or of the camshaft phasor circuit increases, the phase margin setting assures that a corresponding camshaft closed loop control system remains stable.

When the position control module is a PID controller that has series form, the position control module may have a transfer function Gc(s), as shown in equation 1.

$$Gc(s) = \frac{Kc*(sTi+1)*(sTd+1)}{sTi*\left(\frac{sTd}{N+1}\right)} \quad (1)$$

By using a series PID control module, gain calculation equations are provided that are easily managed. Examples of two gain equations, equations 3 and 4, are provided below. Mathematically the solutions for the proportional gain signal Kc and the integration time signal Ti are easily obtainable. Although with parallel PID control modules mathematical solutions are more complicated, parallel PID control modules may be used.

The camshaft phasor system may be considered as an electro-hydraulic system, which is a first order system with an integrator. The camshaft phasor circuit may have a transfer function G(s), as shown in equation 2.

$$G(s) = \frac{K(u,T)*e^{-s*L}}{s*(s*\tau+1)} \quad (2)$$

The camshaft phasor circuit may exhibit delay L, which is equal to approximately twice a time sample h. The time sample h is a computer time increment at which the control system 12' operates and may be, for example, 12.5 ms. The camshaft phasor circuit includes input nonlinearity that is produced by uneven oil flow rate through a phasor, which is largest due to oil temperature changes. The nonlinearity is represented by a nonlinear system gain K(u,T). Note that the symbol * in equations 1 and 2 is multiplication. The system time constant, the nonlinear system gain K(u,T), and the system delay time may be determined, for control module tuning, simulation and control module design. The system time constant, the nonlinear system gain K(u,T), and the system delay time may be determined via one identification run, per engine class.

In one embodiment, the derivative time is set equal to the system time constant. The filtered derivative time, such as Td/N, may be determined with N set equal to a value between approximately 5-20. A closed loop system bandwidth $w_g$, which is gain margin frequency, is selected to satisfy system performance, i.e. the system raise time.

With the known transfer functions Gc(s) and G(s) and the above constraints, the proportional gain signal and the integral time signal are determined using equations 3 and 4.

$$|Gc(jw_g)*G(jw_g)|=1 \quad (3)$$

$$Fm=arg[Gc(jw_g)*G(jw_g)]+\pi \quad (4)$$

The logic for equations 3 and 4 may be included in the gain calculation module. The proportional gain signal and the integral time signal may be determined through substitution of equations 1 and 2 into equations 3 and 4. The phase margin is related to damping of a system and is therefore a performance measure.

In step 218, a gain margin Am and a crossover frequency $w_p$, may be determined using equations 5 and 6 to verify robustness of the camshaft control system.

$$arg[Gc(jw_p)*G(jw_p)]=-\pi \quad (5)$$

$$Am = \frac{1}{|Gc(jw_p)*G(jw_p)|} \quad (6)$$

The gain margin Am is indicative of an amount of change of camshaft phasor circuit characteristics prior to instability in the closed loop system. A phase margin of approximately 60° and a gain margin Am of approximately 5 may be achieved. The proportional gain signal and the integration time signal and the rates of change thereof may be constantly monitored by performance and robustness measures imbedded into the gain control module. For example, the phase margin and the gain margin Am may be continuously determined and monitored.

The above-described steps may be continuously repeated. The above-described steps are meant to be illustrative examples; the steps may be performed sequentially, synchronously, simultaneously, or in a different order depending upon the application.

The above described control systems have low sensitivity to noise originating from position sensor variations. The control systems allows for compensation due to movement disturbances of a camshaft without sensitivity to noise from a camshaft position sensor. Tight control of continuous variable camshaft phasing improves engine torque response and emissions, while simultaneously improving fuel economy.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A camshaft phasor control system for an engine, comprising:
   a position control module that generates a position control signal based on a camshaft position command signal and a first gain signal; and
   a gain calculation circuit that generates said first gain signal based on said position control signal and that feeds said first gain signal back to said position control module,
   wherein said position control module positions a camshaft of the engine based on said first gain signal.

2. The camshaft phasor control system of claim 1 further comprising a camshaft phasor sub-system that generates a camshaft signal indicative of position of said camshaft based on said position control signal, wherein said position control module generates said position control signal based on said camshaft signal.

3. The camshaft phasor control system of claim 2 wherein said camshaft phasor sub-system comprises a camshaft sensor that generates said camshaft signal.

4. The camshaft phasor control system of claim 2 further comprising an adder that sums said camshaft position command signal and said camshaft signal to generate an error signal, wherein said position control module generates said position control signal based on said error signal.

5. The camshaft phasor control system of claim 1 wherein said gain calculation circuit comprises a gain scheduling module that generates a second gain signal based on said position control signal, wherein said position control module generates said position control signal based on said second gain signal.

6. The camshaft phasor control system of claim 5 wherein said gain scheduling module generates said second gain signal based on a temperature signal.

7. The camshaft phasor control system of claim 5 wherein said gain calculation circuit further comprises a gain calculation module that generates said first gain signal based on said second gain signal.

8. The camshaft phasor control system of claim 5 wherein said gain calculation circuit further comprises a filter that filters said position control signal prior to generation of said second gain signal.

9. The camshaft phasor control system of claim 1 wherein said gain calculation circuit comprises a gain calculation module that generates said first gain signal based on said position control signal.

10. The camshaft control system of claim 9 wherein said gain control module generates at least one of an integration time, a derivative time, and a filtered derivative time, and wherein said position control module generates said position control signal based on said at least one of said integration time, a derivative time, and a filtered derivative time.

11. The camshaft control system of claim 9 wherein said gain control module generates said first gain signal based on at least one of a system raise time, a system time constant, a system delay time and a phase margin.

12. The camshaft phasor control system of claim 1 wherein said gain circuit comprises a gain scheduling module that generates a second gain signal based on said position control signal and a gain scheduling look-up table, wherein said position control module generates said position control signal based on said second gain signal.

13. The camshaft phasor control system of claim 1 wherein said position control module includes a proportional integral derivative controller.

14. The camshaft phasor control system of claim 1 wherein said position control module includes a proportional integral derivative controller that has a series form.

15. A control system for an engine, comprising:
 a camshaft sensor that generates a camshaft signal that is indicative of position of a camshaft of the engine;
 a main control module that generates a camshaft position command signal;
 a position control module that generates a position control signal based on said camshaft signal, said camshaft position command signal, and a first gain signal; and
 a gain circuit that receives said position control signal and generates a first gain signal based on said position control signal,
 wherein said position control module generates said position control signal to position the camshaft.

16. The control system of claim 15 wherein said gain circuit comprises:
 a gain scheduling module that generates a second gain signal based on said position control signal; and
 a gain control module that generates said first gain signal based on said second gain signal.

17. The control system of claim 16 wherein said gain control module generates said first gain signal and at least one of an integration time, a derivative time, and a filtered derivative time based on said second gain signal and at least one of a system raise time, a system time constant, a system delay time and a phase margin.

18. A method of operating a camshaft phasor control system for an engine, comprising:
 generating a position control signal based on a camshaft position command signal and a gain signal;
 generating said gain signal based on feedback of said position control signal; and
 positioning a camshaft of the engine based on said gain signal.

19. The method of claim 18 comprising generating said gain signal based on a first transfer function of a position control module and a second transfer function of a camshaft phasor circuit.

20. The method of claim 19 comprising generating said gain signal based on a phase margin and a first expression that equates multiplication of said first and second transfer functions to one (1).

* * * * *